US010129206B2

(12) United States Patent
Spraggs et al.

(10) Patent No.: US 10,129,206 B2
(45) Date of Patent: Nov. 13, 2018

(54) ADDRESSING AND MANAGING AN INTERNAL NETWORK OF A VIRTUAL BRANCH NODE

(71) Applicant: Cisco Technology, Inc., San Jose, CA (US)

(72) Inventors: Simon James Trevor Spraggs, Hants (GB); Nagaraj Arunkumar, Saratoga, CA (US); Yegappan Lakshmanan, Fremont, CA (US); Andrew Persaud, San Jose, CA (US); Michael Yeung, San Jose, CA (US); Andrew Robert Phillips, Dubai (AE); Lang Zhang, San Jose, CA (US); Michael F. O'Gorman, San Carlos, CA (US); Brian Richard Sarbin, Santa Clara, CA (US); Joe Sutton, San Jose, CA (US); Vinay Singla, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 183 days.

(21) Appl. No.: 15/172,356

(22) Filed: Jun. 3, 2016

(65) Prior Publication Data
US 2016/0359805 A1 Dec. 8, 2016

Related U.S. Application Data

(60) Provisional application No. 62/171,311, filed on Jun. 5, 2015.

(51) Int. Cl.
*G06F 15/16* (2006.01)
*H04L 29/12* (2006.01)
(Continued)

(52) U.S. Cl.
CPC ............ *H04L 61/2517* (2013.01); *G06F 8/60* (2013.01); *G06F 9/455* (2013.01);
(Continued)

(58) Field of Classification Search
CPC ............................ H04L 41/00; H04L 61/1511
(Continued)

(56) References Cited

U.S. PATENT DOCUMENTS 8,832,688 B2    9/2014   Tang et al.
8,904,113 B2   12/2014   Chen et al.
(Continued)

OTHER PUBLICATIONS

Cisco, "Cisco Evolved Services Platform Automating a New Class of Carrier Cloud Services," Brochure, Nov. 2014, 9 pages.
(Continued)

*Primary Examiner* — Karen C Tang
(74) *Attorney, Agent, or Firm* — Edell, Shapiro & Finnan, LLC

(57) ABSTRACT

A device is configured to support one or more virtual networking functions at a branch in a network. The device receives from a central control entity a command to deploy a particular virtual networking function, the command including or accompanied by a deployment file that identifies an external port at which the particular virtual networking function is accessed externally at the device. The device maps the external port to an internal port on an internal management network of the device, and stores a portmapping entry for the particular virtual networking function based on the mapping. The device sends to the central control entity a notification containing portmapping information that indicates the internal port to which the external port is mapped.

20 Claims, 5 Drawing Sheets

(51) Int. Cl.
  *G06F 9/455* (2018.01)
  *H04L 12/24* (2006.01)
  *G06F 8/60* (2018.01)

(52) U.S. Cl.
  CPC .......... *G06F 9/45558* (2013.01); *H04L 41/00* (2013.01); *G06F 2009/45595* (2013.01); *H04L 61/1511* (2013.01); *H04L 61/2015* (2013.01); *H04L 61/2514* (2013.01)

(58) Field of Classification Search
  USPC .................................................. 709/231, 232
  See application file for complete search history.

(56) References Cited

U.S. PATENT DOCUMENTS

| | | | |
|---|---|---|---|
| 2011/0296411 A1 | 12/2011 | Tang et al. | |
| 2012/0236854 A1* | 9/2012 | Takagishi | H04L 29/12377 370/389 |
| 2013/0298201 A1* | 11/2013 | Aravindakshan | H04L 63/0272 726/4 |
| 2014/0233568 A1 | 8/2014 | Dong | |
| 2015/0054947 A1* | 2/2015 | Dawes | H04L 67/025 348/143 |
| 2015/0058473 A1 | 2/2015 | Grande et al. | |
| 2015/0063166 A1* | 3/2015 | Sif | G06F 9/45558 370/254 |
| 2015/0124815 A1* | 5/2015 | Beliveau | H04L 45/38 370/392 |
| 2016/0173650 A1* | 6/2016 | Hala | H04L 67/34 709/203 |
| 2016/0248872 A1* | 8/2016 | Fausak | H04L 67/1002 |
| 2017/0111274 A1* | 4/2017 | Bays | H04L 45/74 |
| 2017/0295033 A1* | 10/2017 | Cherian | H04L 12/4633 |
| 2017/0295265 A1* | 10/2017 | Hala | H04L 69/18 |
| 2017/0353324 A1* | 12/2017 | Baum | H04L 67/025 |
| 2018/0006870 A1* | 1/2018 | McChord | H04L 29/14 |

OTHER PUBLICATIONS

Cisco, "Network Optimization Through Virtualization: Where, When, What, and How?," White Paper, Oct. 2014, 4 pages.
Cisco, "Cisco Elastic Services Controller," Data Sheet, Mar. 2016, 6 pages.
Cisco, "NFV Management and Orchestration: Enabling Rapid Service Innovation in the Era of Virtualization," White Paper, Nov. 2015, 9 pages.
Oasis, "Virtual I/O Device (VIRTIO) Version 1.0, Committee Specification Draft 01 /Public Review Draft 01," Dec. 3, 2013, http://docs.oasis-open.org/virtio/virtio/v1.0/c.sprd01/virtio-v1.0-csprd01.pdf, 69 pages.

* cited by examiner

ADDRESSING AND MANAGING AN INTERNAL NETWORK OF A VIRTUAL BRANCH NODE

CROSS REFERENCE TO RELATED APPLICATION

This application claims priority to U.S. Provisional Application No. 62/171,311, filed Jun. 5, 2015, the entirety of which is incorporated herein by reference.

TECHNICAL FIELD

The present disclosure relates to virtual networking.

BACKGROUND

A virtual branch (vBranch) is a way of providing services in a branch environment. In the past, branch services were either provided by a bunch of physical appliances stacked in the branch location or by an integrated solution where all service functions were provided by one software stack. With the advent of Network Function Virtualization (NFV), consideration is being given to a solution where the service functions are virtualized on a hardware platform in the branch environment. This provides a mechanism whereby services can be added quickly, without "truck rolls" and without physically re-wiring the branch location.

DESCRIPTION OF EXAMPLE EMBODIMENTS

Overview

In accordance with an embodiment, a device is configured to support one or more virtual networking functions at a branch in a network. The device receives from a central control entity a command to deploy a particular virtual networking function, the command including or accompanied by a deployment file that identifies an external port at which the particular virtual networking function is accessed externally at the device. The device maps the external port to an internal port on an internal management network of the device, and stores a portmapping entry for the particular virtual networking function based on the mapping. The device sends to the central control entity a notification containing portmapping information that indicates the internal port to which the external port is mapped.

Example Embodiments

Virtual Branch (vBranch) is Network Functions Virtualization (NFV) orchestration solution for the branch environment that is capable of supporting Virtual Network Functions (VNFs) of multiple vendors and customer applications. VBranch is useful for Service Provider managed services and enterprise Do-it-Yourself (DIY) environments. The vBranch design aims to complement the existing centralized cloud virtual private network (cloudVPN) offering, so the same basic orchestration infrastructure extends from the largest datacenter, through regional datacenters right down to the branch.

Figure 1:
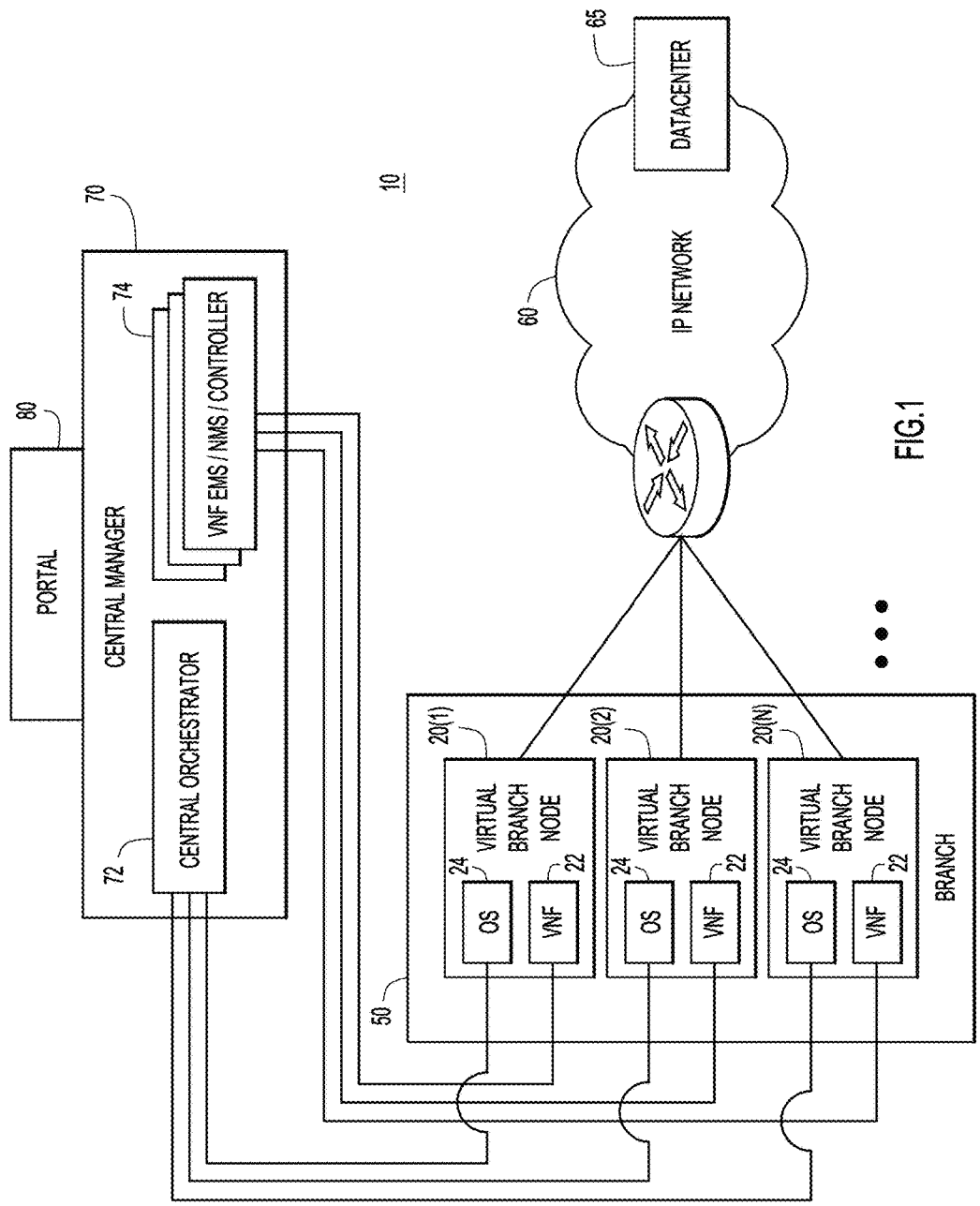
FIG. 1 is block diagram of a virtual branch system architecture, according to an example embodiment.

Reference is first made to FIG. 1. FIG. 1 illustrates a system 10 in which traditional routers and physical appliances are replaced with a hardware (e.g., x86) platform that supports VNFs and virtual networks. To gain the full benefit of branch virtualization it is important for the local orchestrator and the virtual appliances to be managed by a central orchestration subsystem. The system includes a plurality of vBranch nodes 20(1)-20(N) at a branch 50 that have Internet Protocol (IP) connectivity to an IP network 60 and to a central manager 70. While FIG. 1 shows N vBranch nodes, in most deployments, there will only be one or two vBranch nodes at a branch. A datacenter 65 may also be connected to the IP network 60. There may be multiple (potentially thousands of) branches 50, but for simplicity in FIG. 1, only a single branch is shown. Each vBranch node includes at least one VNF shown at reference numeral 22 and an operating system (OS) shown at reference numeral 24.

Examples of virtual networking functions that may run on a vBranch node include a cloud service router (CSR), adaptive security appliance (ASA), web security appliance (WSA), wide area application services (WAAS), and other networking functions. CSR is a software router that is deployed as a virtual machine (VM) in a vBranch node using Linux KVM virtualization infrastructure. It supports comprehensive networking and security functions. ASA is a software firewall that is deployed as a VM in a vBranch node using Linux KVM virtualization infrastructure. It supports security features consistent with hardware-based appliance. WSA is a software web security appliance that is deployed as a VM in a vBranch node using Linux KVM virtualization infrastructure. It supports security features consistent with hardware-based WSA.

The central manager 70 may integrate functions of a central orchestrator 72 and a VNF Network Management System/Element Management System (NMS/EMS) controller 74. A portal 80 is provided that enables user/administrator access to the central manager 70. In some implementations, the central orchestrator 72 and the VNF EMS/NMS controller 74 are combined into one entity.

The system 10 is designed to support a large number of branch locations (thousands) with a small number of VNFs (for example, 8) at each branch. Initially, these VNFs will run as virtual machines (VMs) on a kernel-based virtual machine (KVM) but the architecture may also support other hypervisors and containers technology without requiring upgrades of the NFV orchestrator 72.

The central orchestrator 72 is a central orchestration component responsible for the control and management of all vBranch nodes associated with a customer. It performs a number of functions. First, it provides a central repository where VNF software and service profiles models reside. The service profile model describes how VNFs should be deployed and connected when they are implemented on a vBranch node. Second, it maintains ongoing status of vBranch nodes. Third, the central orchestrator 72 on-boards, using zero touch provisioning techniques as described herein, new vBranch nodes into the system 10 when they are first deployed, and thereafter monitors the status of the vBranch nodes.

The portal 80 is a central component that provides two portal functions. The first is the user portal function to allow an end-user to select, manage and perform very basic problem determination on VNFs and service profiles (a collection of VNFs chained together) at the branch level. In the case of a service provider-managed service environment, the end-user would be the network or IT administrator of the end-user customer. In the case of an enterprise environment, the end-user would be network or IT administrator depending on organization's setup. The second function is the operator portal function. This provides an interface to define and onboard new VNFs and new service profiles model, perform problem determination and to gather analytical information associated with the VNF infrastructure for one or more vBranch nodes. In a service provider-managed service environment, this may be an individual from the service provider. In enterprise environments, this would be either second line IT or network support depending on organizational setup.

While the virtual branch system 10 solves many problems associated with providing a rich and adaptable service infrastructure in the branch, it does present some challenges. In particular, there is a hardware platform and its OS in the branch that needs to be managed and addressed through a wide area network (WAN) connection. The OS and particularly the local VNF manager component of the OS is important in managing the branch environment because it is the first component booted up in the branch and is responsible for orchestrating a virtual router in the branch. Therefore, it cannot be addressed through the router in the branch. It needs to be accessible in its own right through the WAN connection. The local VNF manager component in the virtual branch needs a logical local management network to the VNFs to enable local life management of those VNFs. The central orchestrator needs to be able to access the VNFs through the logical local management network for configuration purposes. This is typically through a WAN interface. WAN addressing is generally very constrained and every effort needs to be made to preserve these addresses. The addressing of the WAN interface is often completely under the control of the Service Provider. Moreover, it is important to ensure that the number of addresses or routes associated with the vBranch infrastructure does not increase significantly due to the act of virtualization.

Thus, presented herein are mechanisms that permit a central orchestrator (or any other entity accessible through the WAN) to access VNFs on the local management network in a secure fashion that increases the IP address count on the WAN by one and does not increase the number of subnets or routing in the network to support access to VNF interfaces on the local management network.

Figure 2:
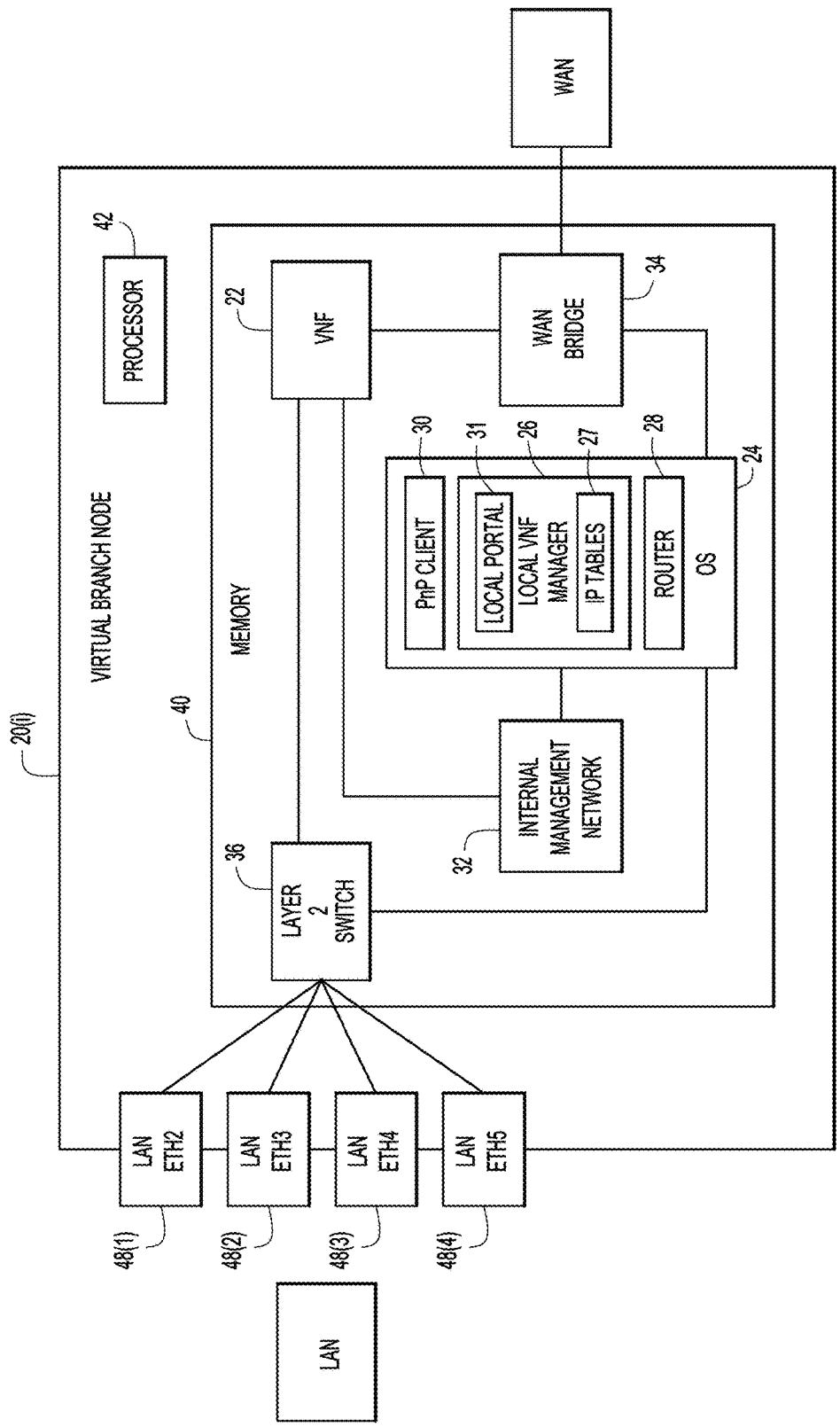
FIG. 2 is a block diagram of a virtual branch node according to an example embodiment.

Reference is now made to FIG. 2 that illustrates a virtual branch node, generically denoted by reference numeral 20(*i*). The virtual branch node 20(*i*) includes one or more VNFs, one VNF 22 being shown for simplicity, the OS 24, as described above in connection with FIG. 1. Running on the OS 24 is local VNF manager 26, a virtual router 28, a Plug-and-Play (PnP) client 30 and a local portal 31. There is an internal management network 32 and a WAN bridge 34. In addition, there is an internal layer 2 switch 36 to provide local area network (LAN) connectivity. PnP is a protocol in which the PnP client 30 automatically activates with the vBranch node booting up and it tries to call to a PnP server in the NCS to notify the NCS that the vBranch node is alive and running.

The WAN bridge 34 could be completely discrete from the VNFs access to the network, shared using an internal bridge or shared using virtual functions within an input/output virtualization (SR-IOV) environment.

WAN bridge 34 and layer 2 switch 36 are embodied in software that resides in memory 40 that is executed by processor 42. However, in another form, the layer 2 switch 36 may be supported by a dedicated piece of hardware supporting layer 2 switching residing in the vBranch node.

The internal management network 32 has several roles. First, it establishes the route by which the local orchestrator and the central orchestration subsystem program the VNFs. Second, it is the way the local orchestrator function monitors the liveliness of local VNFs.

The memory 40 may be read only memory (ROM), random access memory (RAM), magnetic disk storage media devices, optical storage media devices, flash memory devices, electrical, optical, or other physical/tangible memory storage devices. Thus, in general, the memory 40 may comprise one or more tangible (non-transitory) computer readable storage media (e.g., a memory device) encoded with software comprising computer executable instructions and when the software is executed (by the processor 42) it is operable to perform the operations described herein.

The local VNF manager 26 is a lightweight piece of software that runs as an application or a VM on the OS 24. It is responsible for the local configuration of the node, the on-going life-cycle management of the VNF 22 and providing a local interface to the local orchestration environment. The local VNF manager 26 manages content stored in IP tables (firewall and network address translation (NAT) tables) associated with the OS 24, as shown at reference numeral 27.

There also needs to be a way for the central orchestrator to access the OS 24 and the local VNF manager that is independent of the VNFs on the vBranch node. This is shown at the WAN bridge 34 and it could be via a dedicated interface, an interface shared with VNFs using a virtual bridge resident within the OS or, as or an SR-IOV card on which one virtual functions is dedicated to the OS 24 and local VNF manager 24 and another virtual function is dedicated to one or more VNFs 22.

Finally, one or more internal layer 2 switches (e.g., switch 36) can be provisioned using switches configured within the OS itself or through a hardware switching infrastructure that is closely integrated into the vBranch node. The VNFs configured on the vBranch node connect to one or more of these internal layer 2 switches. Optionally, these layer 2 switches can have physical ports connected to them FIG. 2 shows, as an example, where internal layer 2 switch 36 has eth2, eth3, eth4, eth 5 interfaces 48(1)-48(4) connected to it.

A special example of an internal layer 2 switch is the internal management network 32. All VNFs spun up by the local VNF manager 26 are connected to this layer 2 network. This is used by the local VNF manager 26 to configure and monitor the VNFs running on the vBranch node. This is also one of the means by which the central orchestrator can onboard and configure the actual VNFs on the vBranch node. Other means is through the WAN bridge 34 via the VNFs. If access to these VNFs by the central orchestrator is needed via the internal management network then technology such as port address translation (PAT) and network address translation (NAT) are used. Further, the central orchestrator needs to determine addresses and ports to use when it connects to a specific VNF.

In other words, it is necessary to manage the VNF 22 and any other VNFs through the addresses on the internal management network 32, and enable a way for the central orchestrator 72 to manage the vBranch node 20. There are a number of ways to make the VNF's network management addresses available on the network so that the central orchestrator 72 can access them. One way is to advertise the network address of the internal management network of each vBranch node into the wider network, but this could involve many thousands of addresses subnets within the wider network (one for each vBranch node under management). Rather than do this, the local VNF manager 26 is given an IP address, which is the same address as that of the OS 24. When the VNF 22 comes up, it is connected to the internal management network 32, and the local VNF manager 26 sets up a NAT statement and "holes" in a firewall associated with the OS 24 so that the central orchestrator can access the address of the OS 24 (and consequently of the local VNF manager 26) on a specific port so in order to access the VNF's management port.

The OS 24 may have several attributes. It may be an OS based on the Linux™ technology, and use a Qemu/KVM hypervisor. Hypervisor management may be achieved by way of Libvirt technology. Networking of the OS is Open Virtual Switch (OVS), SR-IOV or interface with a hardware switch. The OS 24 participates in service chaining for LAN or VLAN stitching, and may use IETF Network Services Header (NSH) techniques.

The local VNF manager 26 performs life cycle management of virtual services and performs the role of the VNF Manager (VNFM) in the branch environment. The main functions of local VNF manager 26 include:

Implementing VNF service profiles requests sent down by the central NCS orchestrator system.

On-going monitoring and error recovery of local VNFs

Autonomous life-cycle management of VNFs and virtual networks, irrespective of whether there is contact with central orchestration platform or not.

Local and external error and event logging

Local portal offering read and read/write capability

Loading of a day 0 configuration file onto the VNF via a configuration drive

In the vBranch node, a local VNFM (VNF manager) is useful to enable onsite problem determination and for the branch to function even if connected to the central control entity is lost (running in "headless" mode). When compared with a datacenter-orientated VNFM, there is significant overlap such as the northbound interface requirements and basic overall functionality. However there are differences, including very low number of servers controlled (one or two at the branch level), small number of VMs/VNFs and a compute infrastructure that is highly constrained. Therefore, the local VNF manager 26 may run as part of the base operating system, interface, through Libvirt to KVM and utilize highly optimized components to reduce server overhead.

The PnP client 30 registers new vBranch nodes to the central orchestrator 72. The PnP client 30 on the vBranch node calls home to the central PnP server (described hereinafter in connection with FIG. 3) when the local VNF manager 26 is up and operational on the vBranch node. The role of the PnP client 30 is to uniquely identify the vBranch node and its IP address to the central orchestration system. This starts a series of events in the central orchestrator 72 that result in the central orchestrator 72 adding the local VNF manager 26 to the device list and the central orchestrator connecting to the vBranch node using a protocol such as netconf or the Representational State Transfer (REST) protocol. This is used for information/control exchange between the central orchestrator and a vBranch node for the management of the server and the orchestration and management of VNFs. The PnP client's only function is to identify the vBranch node to the central orchestrator. Consequently, it can be very basic in nature. It should also not rely on PnP options being passed via DHCP because in overlay environments the Dynamic Host Configuration Protocol (DHCP) address allocation process may be under the control of a third party organization.

The portal 31 is the local interface to the local VNF manager on the vBranch node. The portal 31 provides read and write capabilities so the operator can use it to query the vBranch node and associated VNFs but also control them if connectivity to the central orchestrator is not operational. Some of the capabilities of the portal include:

Multiple levels of user privilege with password access.

Simple landing screen outlining current and past system and VNF performance.

Read and write to control local network and VNF set-up.

Visualization of the VNF and network topologies.

Local image information.

Deployments details—list of deployed device and status, drill down into more detailed look on the VM: image, Interfaces, number of CPUs, memory, day 0 configuration loaded, access to VM console from local VNF manager and VM log data Status of PnP registration process to NCS.

NETCONF session status for the local VNF manager to the central orchestrator.

Static information on physical server (serial number, CPU, model, installed components) and dynamic information of server status (CPU usage, memory utilization etc.).

Ability to define and query the local VNF manager for scaling, monitoring parameters for a VNF before it is started up. Ability to query the monitoring status on a VNF once up and running (the rules and the current status.

Meaningful logs on VNF events (e.g., spin up, spin down, failures, image download, service registration) command line interface (CLI) access to the local VNF manager.

Version information of the local VNF manager.

Diagnostics button to create text file of diagnostic information.

Virtualization of the branch changes some of the basic assumptions about how the branches are addressed and managed. Today, the critical entity for branch management is the physical router. This routing function terminates customer and management traffic. In the vBranch environment, the critical entity changes from the branch routing to the local VNF manager 26. The local VNF manager 26 shares an IP address with the OS 24 and the PnP client 30. The local VNF manager 26 needs to be in contact, using the management path, with the central orchestrator and the "central image repository" before VNFs (22), such as the routing VNF, can be orchestrated and configured. These management interactions are completely separate from the customer traffic flows, which only appear once the VNFs are up and running.

The branch can be split into three main components:

WAN: connectivity from the management and customer networks to the Wide Area Network.

Customer/LAN: Internal switching and bridging to connect the WAN to the customer LAN ports, e.g., ports 48(1)-48(4).

Management: Internal network to manage and orchestrate the VNFs and virtual networks.

Figure 3:
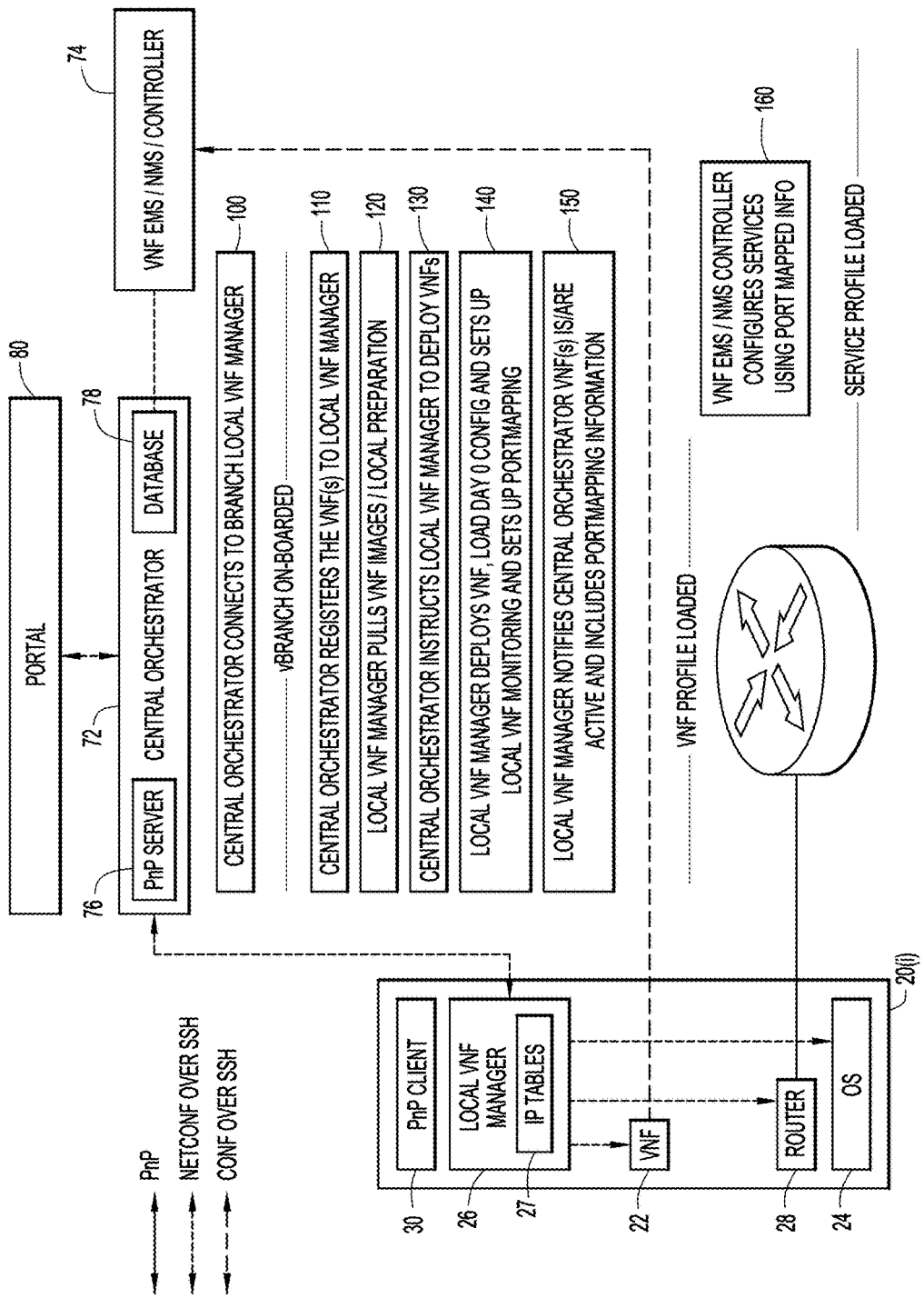
FIG. 3 is a diagram depicting a process for deploying a virtual networking function on a virtual branch node, according to an example embodiment.

Turning now to FIG. 3, with continued reference to FIG. 2, the operational flow is as follows. A primary purpose of the vBranch orchestration is to manage VNF service profiles on the vBranch node. A VNF service profile describes one or more VNFs inter-connected via virtual and physical network components, providing a set of services at a vBranch node. The following describes how the vBranch node interacts with the central orchestrator and how VNF service profiles are managed. The vBranch architecture anticipates the vBranch node is delivered to the branch locations with the OS 24 and the local VNF manager 26 pre-installed.

When the vBranch node is powered on for the first time, it loads the OS 24, gets an IP address (statically or via DHCP) and initializes the local VNF manager 26. Once the local VNF manager 26 is operational, it initiates the local PnP client 30 to "call home" to the PnP server 76 in the central orchestrator 72. To do this PnP call home, the OS 24 needs a stable IP address and either the IP address, a domain name or the fully qualified name of the PnP server 76. This information can be pre-configured in the vBranch node, entered as part of the initial boot up or be provided via DHCP. Three potential startup scenarios are envisaged:

DHCP with option 60/43: The DHCP server inserts the IP address or hostname of the PnP server 76 using DHCP option 43 upon receipt of the option 60 from the end device. When the DHCP response is received by the device, the PnP client 30 extracts the option 43 from the response to get the IP address or the hostname of the PnP server 76. The PnP client 30 then uses this IP address or hostname to communicate with the PnP server 76.

PnP server resolution using DNS lookup: When the DHCP discovery fails to get the IP address of the PnP server 76, the PnP client 30 falls back on Domain Name System (DNS) lookup method. The PnP client 30 obtains the domain name of the customer network from the DHCP response and constructs the fully qualified domain name (FQDN). The following FQDN is constructed by the PnP client 30 using a preset deployment server name and the domain name information for the DHCP response. The PnP client 30 then looks up the local name server and tries to resolve the IP address for the above FQDN.

Manual configuration: If neither DHCP or DNS is available then IP address and PnP server names can be entered manually, i.e., the device is pre-staged with either IP address, PnP server or both.

The PnP call home contains the IP address of the local VNF manager 26 and also the device's serial number. This PnP call home process causes the central orchestrator 72 to start the onboarding process of the new vBranch node.

Internal networking setup may be achieved as follows. The OS 24 is responsible in creating the management OVS to ensure the management plane is always available even in absence of a functional local VNF manager. The local VNF manager 26 is responsible in creating all other networks in the uCPE platform (i.e., LAN OVS and etc.). The local VNF manager 26 acts as a broker in the network creation process and leverage the underlying components to execute the actual operation. The local VNF manager 26 will leverage content in a local network configuration file to facilitate the creation of all required networks. The network configuration information can come from central orchestrator 72 or modified based on instructions from central orchestrator 72.

As explained above in connection with FIG. 2, the PnP client 30 in the vBranch node, automatically, upon the vBranch node booting up, communicates with PnP server 76 in the central orchestrator 72.

The onboarding process for a new vBranch is about bringing the server (the vBranch node), OS and the local VNF manager under central orchestrator management. It consists of the following steps:

A call is initiated by the local VNF manager 26 to the local PnP client 30, in turn to the PnP server 76 using the PnP protocol.

The PnP server 76 adds the vBranch node to the PnP-state/device list and asks the device for its device-info.

The vBranch node responds with its device-info.

The PnP server 76 will add the version string to the entry in the PnP-state/device entry for the vBranch node and try to look up the device in the PnP/map list. If an entry exists it will start the configuration process, if not it will tell the device to back off for awhile.

If the vBranch node exists in the PnP/map list a request to configure the device for secure shell (SSH) communication, and adding a new user (the user configured in the PnP/map entry) is sent to the device.

Once the local VNF manager 26 is successfully configured for SSH, it reports that it has been successfully configured for SSH to the central orchestrator 72.

The central orchestrator 72 mounts the vBranch node:
1. An entry for the device is created in the devices/device list, with authgroup, device-type etc. from the PnP/map list.
2. The ssh/fetch-host-keys action is executed.
3. The sync-from action is executed.

Once the device has been successfully synced a netconf notification is sent.

A customer then needs to claim the local VNF manager 26 through the user portal.

The information needed by the PnP server 76 for a device is:

Device serial number (devices have a universal device identifier).

Device name in the devices/device list device type to use when adding the device to central orchestrator.

Network Element Driver (NED) ID, i.e., which NED to use. For local VNF manager 26, it may be a Yang model authgroup to use for communicating with the device.

Name and password of user to add on the device.

Domain to use when generating the SSH-keys on the device, which could be a dummy value.

All of the above, except serial number and device name could be derived from some common store. The device type and the Yang model could be calculated through a mapping of the device version string sent by the device during the initial PnP handshake.

Initially, there are no VNFs configured on the central orchestrator 72 and there is netconf protocol communications between the central orchestrator and the local VNF manager 26 on the vBranch node. The IP tables 27 are closed with the exception of essential management protocols, e.g., Secure Shell (ssh), PnP and netconf.

Once the local VNF manager 26 is operational and under control of the central orchestrator 72, it is initially devoid of VNFs. It can be left in this null VNF state, awaiting a request via the user or operator portal, to load a VNF service profile. Alternatively, a VNF service profile can be pre-specified in the central orchestration systems (e.g., central orchestrator 72), in which case it is loaded as soon as the local VNF manager 26 is up and in contact with central orchestrator. There are no port address translations defined in the IP tables 27.

To implement a VNF service profile the following actions are used. The central orchestrator 72 generates a registration Extensible Mark-up Language (XML) file for each VNF (or group of VNFs). The central orchestrator 72 generates network XML files or uses a pre-built network on the vBranch node. The central orchestrator 72 conveys these requests to the local VNF manager 26 using Yang models over netconf, and the process proceeds as now described in connection with FIG. 3.

At 100, the central orchestrator 72 connects to the local VNF manager 26 in the virtual branch node 20(i). This communication may be conducted using the netconf protocol.

At 110, the central orchestrator 72 registers the VNF(s) 22 to the local VNF manager 26. When the central orchestrator 72 requests a VNF it first sends the registration file (e.g., in XML format) to the local VNF manager 26 on the vBranch node. This prepares the image for deployment. At 120, the local VNF manager pulls the VNF images for preparation. At 130, the central orchestrator instructs the local VNF manager 26 to deploy the VNF(s). At deployment time, the central orchestrator 72 sends the deployment XML file to the local VNF manager 26 on the vBranch node. This tells the local VNF manager 26 to deploy the VNF, and includes information for network connectivity, as well as monitoring and recovery requirements for the VNF. As part of the deployment a Javascript object notation (JSON) file is referred which describes how the VNF should be accessed externally. The format of the file may take the form shown below:

```
{
"networks": [
{
"name": "mgmt-net",
"ports": [
{
"type": "ssh",
"protocol": "tcp",
"vnf_port": "22",
"external_port_range": {
"start": "20022",
"end": "20022"
}
}
]
}
}
```

The statement "type": "ssh" indicates that the management port is an SSH port.

The statement "protocol": "tcp" indicates that the protocol to use Transmission Control Protocol (TCP).

The statement "vnf_port": "22" indicates that the TCP port for the VNF is port "22".

The statement "start": "20022" indicates that to connect to TCP port "22", it is necessary to connect to external port "20022" from the outside world.

Thus, upon receiving the deployment file, the local VNF manager, at 140, deploys the VNF, sets the day 0 configuration for the VNF, sets up local VNF monitoring and sets up the portmapping. The local VNF manager opens a hole in the firewall (e.g., of the router 28). In the example above, the local VNF manager 26 opens the external port "20022" in the IP tables 27 and sets up a port address translation entry in the IP tables 27 mapping external port "20022" to TCP port "22". As a result, port 22 on the VNF 22 can be accessed by SSH communication to the external address of the local VNF manager 26 on port 20022. At 150, the local VNF manager automatically notifies, e.g., via netconf, the central orchestrator that the VNF(s) is active and includes the portmapping information so that the central orchestrator knows how to access the VNF. Thereafter, the central orchestrator 72 stores this information within its database, shown at reference numeral 78, such that if it needs to access the VNF to configure it, it will use the vBranch node's outside address plus the port address (e.g., port 20022 in the above example) it learned via netconf. At 160, the central orchestrator configures services for the VNF, as necessary, using the portmapping information.

Accordingly, the vBranch node is deployed with just a management network and a LAN. The vBranch node obtains all the configuration and VNF automatically from the central orchestrator 72.

As described above, VNFs are deployed using a deployment XML file. Within that file, the IP address of the VNF on the management network is specified, and then the local VNF manager does the portmapping described above. If multiple VNFs are to be deployed using the same deployment XML file, the local VNF manager 26 can dynamically allocate the IP address of the VNF on the management network.

The following is an example of a portion of a deployment file.

```
<interfaces>
<interface>
<nicid>0</nicid>
<network>int-mgmt-net</network>
<ip_address>10.20.0.26</ip_address>
<port_forwarding>
<port>
<type>ssh</type>
<protocol>tcp</protocol>
<vnf_port>22</vnf_port>
<external_port_range>
<start>22622</start>
<end>22622</end>
</external_port_range>
</port>
</port_forwarding>
</interface>
</interfaces>
```

To access the VNF described in this deployment file, an entity outside the vBranch node (e.g., the central orchestrator) would go to the IP address of the local VNF manager 26 on the vBranch node, which is port 22622, and the portmapping function on the vBranch node maps port 22622 to 10.20.0.26, port 22. The IP address 10.20.0.26 can be statically configured. However, if instead, the local VNF manager allocates this IP address 10.20.0.26 dynamically, then the same deployment file can be used for multiple VNFs on the same device because the local VNF manager would dynamically define a different IP address for each VNF, and consequently a different portmapping for each VNF. Moreover, to do this, the statement <end>22622</end> would be changed to a higher number to provide for a greater range, such as 22700 or the like. This is particularly important in a vBranch environment where address availability is more limited.

For example, for a first virtual networking function, the local VNF manager may generate portmapping information as follows:
IP address (of local VNF manager): 10.20.0.26
External Port: 22622
Internal Port: 22

For a second virtual networking function, the local VNF manager may generate portmapping information as follows:

IP address (of local VNF manager): 10.20.0.28
External Port: 22623
Internal Port: 23

Thus, the local VNF manager 26 dynamically allocates a different external address for each of multiple virtual network functions on the device. As a result, a different port address translation entry is created for each of the multiple virtual networking functions using a different external address and different external port.

Figure 4:
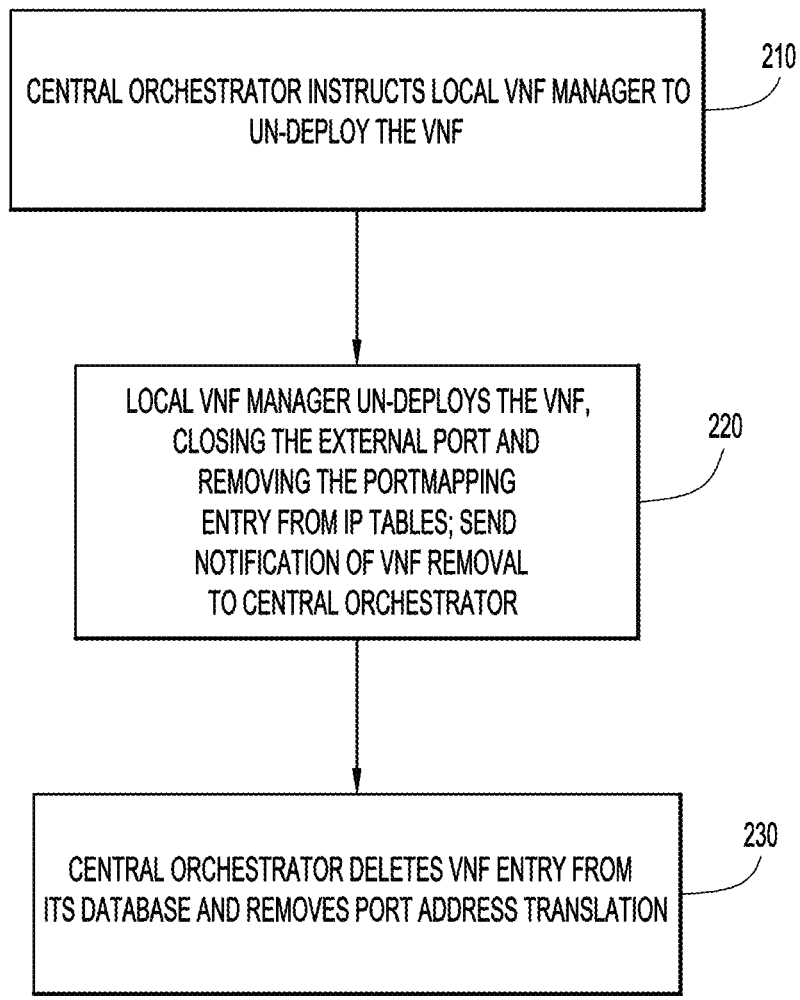
FIG. 4 is a diagram depicting a process for removing a virtual networking function on a virtual branch node, according to an example embodiment.

When it is time to remove a VNF on a vBranch node, the procedure 200 as shown in FIG. 4 is followed. At 210, the central orchestrator instructs the local VNF manager to un-deploy the VNF. At 220, the local VNF manager 26 un-deploys the VNF. As part of this process, the local VNF manager 26 closes the external port and removes the port-mapping entry from the IP Tables 27. The local VNF manager 26 sends notification of removal to the central orchestrator 72, via netconf. At 230, when the central orchestrator receives the netconf notification from the local VNF manager 26 that the VNF has been successfully removed, it deletes the VNF entry from its database associated with the vBranch node and in the process removes all knowledge of the port address translation.

Figure 5:
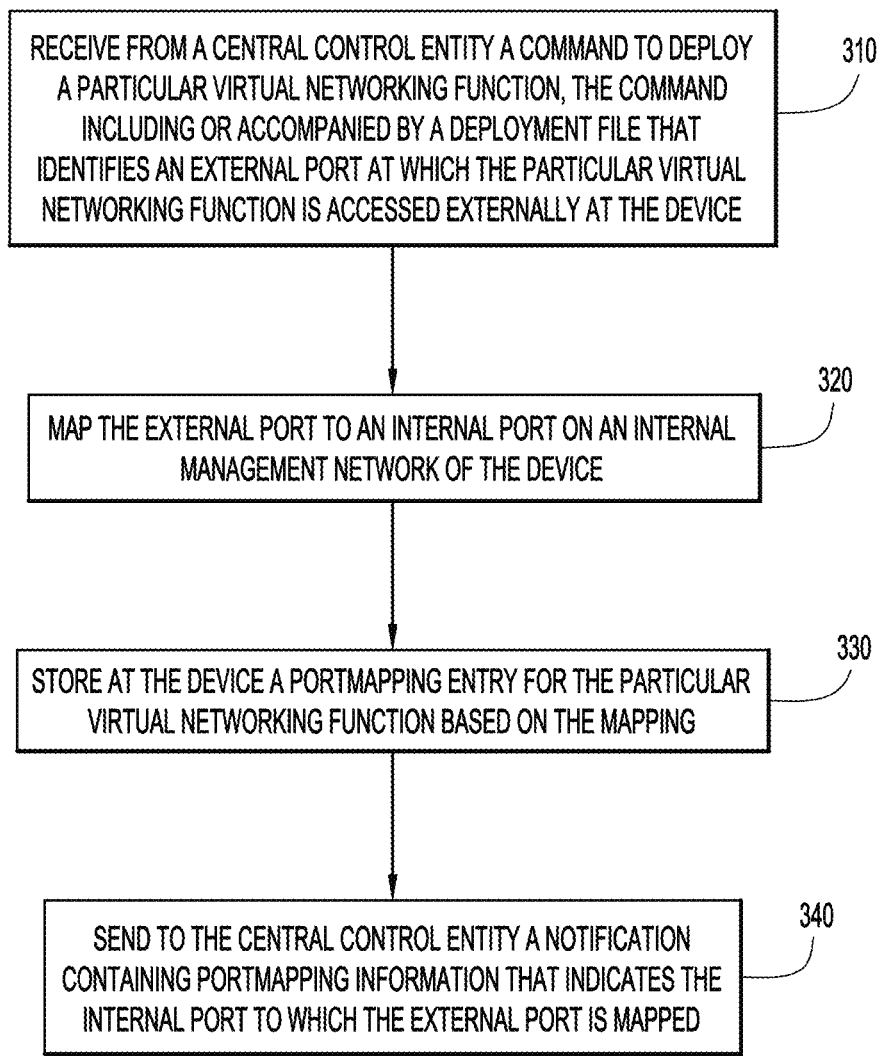
FIG. 5 illustrates a flow chart generally depicting a process for deploying and creating a portmapping entry for a virtual networking function on a virtual branch node, according to an example embodiment.

Turning now to FIG. 5, a flow chart is shown for a process 300 that is performed at a vBranch node, according to the techniques described above in connection with FIGS. 1-3. Reference is made to FIGS. 1-3 for purposes of this description. The vBranch node is a device configured to support one or more virtual networking functions at a branch in a network. At 310, the device receives from a central control entity (e.g., central orchestrator 72) a command to deploy a particular virtual networking function, the command including or accompanied by a deployment file that identifies an external port at which the particular virtual networking function is accessed externally at the device. At 320, the device maps the external port to an internal port on an internal management network of the device. At 330, the device stores a portmapping entry for the particular virtual networking function based on the mapping. At 340, the device sends to the central control entity a notification containing portmapping information that indicates the internal port to which the external port is mapped.

As described above, the deployment file may further indicate a port type of the internal port and protocol type for a communication protocol supported on the internal port. Moreover, the deployment file may include an external address of a virtual networking function control process (e.g., the local VNF manager 26) executing on the device. The mapping operation 320 may involve generating a port address translation entry stored by the control process, wherein the port address translation entry maps the external port to the internal port so that the particular virtual networking function can be accessed by communication to the external address of the control process on the external port.

In one embodiment, as described above, the control process dynamically allocates a different external address for each of multiple virtual networking functions on the device. In so doing, a different port address translation entry is created for each of the multiple virtual networking functions using a different external address and different external port.

To summarize, a solution is provided by which a local orchestrator (e.g., the local VNF manager 26 referred to above) can life-cycle manage VNFs in a branch environment. The processes described herein allow external entities (such as a central orchestrator) to access VNFs on the vBranch local management network in a secure fashion without consuming large numbers of WAN IP addresses or increasing the size of the routing tables. The local VNF manager 26 assigns the port mapping on the device and sets up the right firewall actions. The outside port and address is then conveyed to the central orchestrator using a netconf notification. This is then programmed into central orchestrator such that the central orchestrator can communicate to the VNFs on the local management network using a port address translation connection.

This process is secure and closed based on VNF state. It achieves very efficient WAN addressing, i.e., one IP address for all VNFs on the local management LAN of a vBranch node, in one embodiment. Information is conveyed back to central orchestrator to notify it as to how to access the remote VNF. Private addressing and common addressing can be used in all sites on the local management LAN of the vBranch nodes. Again, this process is totally automated.

WAN interface addresses may be severely constrained. WAN interface addresses are normally controlled by service providers and there is very limited or no flexibility in addressing options. Therefore, simply exposing the local management network and all VNFs connected is not feasible. The solution provides a secure dynamic mechanism that allows a central orchestrator to connect to devices on the local management network within the vBranch node without consuming large amounts of WAN addresses nor increasing the size of the core routing tables.

In one form, a method is performed at a device configured to support one or more virtual networking functions at a branch in a network, the method comprising: receiving from a central control entity a command to deploy a particular virtual networking function, the command including or accompanied by a deployment file that identifies an external port at which the particular virtual networking function is accessed externally at the device; mapping the external port to an internal port on an internal management network of the device; storing at the device a portmapping entry for the particular virtual networking function based on the mapping; and sending to the central control entity a notification containing portmapping information that indicates the internal port to which the external port is mapped.

In one form, the deployment file further indicates a port type of the internal port and a protocol type for a protocol supported on the internal port. The deployment file may further include external address of a virtual networking function control process executing on the device. The mapping may involve generating a port address translation entry stored by the virtual networking function control process, wherein the port address translation entry maps the external port to the internal port so that the particular virtual networking function can be accessed by communication to the external address of the virtual networking function control process on the external port. The virtual networking function control process may dynamically allocate a different external address for each of multiple virtual networking functions on the device. A different port address translation entry may be generated for each of the multiple virtual networking functions using a different external address and different external port. The device may receive from the central control entity a command to un-deploy the particular virtual networking function on the device. In response to receiving the command to un-deploy the particular virtual networking function, the external port is closed and the stored portmapping entry for the particular virtual networking function is removed. The device may further send to the central control entity a notification of removal of the particular virtual networking function.

In another form, an apparatus is provided comprising: a communication interface configured to enable network communications; a memory configured to store executable instructions for one or more virtual networking functions; and a processor coupled to the communication interface and the memory, wherein the processor is configured to: receive from a central control entity a command to deploy a particular virtual networking function, the command including or accompanied by a deployment file that identifies an external port at which the particular virtual networking function is accessed externally; map the external port to an internal port on an internal management network; store a portmapping entry for the particular virtual networking function based on the mapping; and send to the central control entity a notification containing portmapping information that indicates the internal port to which the external port is mapped.

In still another form, one or more non-transitory computer readable storage media are provided encoded with instructions that, when executed by a processor in a device configured to support one or more virtual networking functions at a branch in a network, cause the processor to perform operations comprising: receiving from a central control entity a command to deploy a particular virtual networking function, the command including or accompanied by a deployment file that identifies an external port at which the particular virtual networking function is accessed externally at the device; mapping the external port to an internal port on an internal management network of the device; storing at the device a portmapping entry for the particular virtual networking function based on the mapping; and sending to the central control entity a notification containing portmapping information that indicates the internal port to which the external port is mapped.

In still another form, a system is provided comprising: a device configured to support one or more virtual networking functions at a branch in a network; and a central control entity. The central control entity generates and sends to the device a command to deploy a particular virtual networking function, the command including or accompanied by a deployment file that identifies an external port at which the particular virtual networking function is accessed externally at the device. The device receives the command and maps the external port to an internal port on an internal management network of the device. The device stores a portmapping entry for the particular virtual networking function based on the mapping. The device then sends to the central control entity a notification containing portmapping information that indicates the internal port to which the external port is mapped.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method of securely accessing a virtual networking function on a device of a branch in a network, the method comprising:
    at a device configured to execute one or more virtual networking functions at a branch in a network, receiving from a central control entity a command to deploy a particular virtual networking function at the device, the command including or accompanied by a deployment file that identifies an external port at which the particular virtual networking function is accessed externally at the device;
    mapping the external port identified by the deployment file from the central control entity to an internal port on an internal management network of the device;
    storing at the device a portmapping entry for the particular virtual networking function executing on the device based on the mapping between the external port and the internal port;
    sending to the central control entity a notification containing portmapping information that indicates the internal port to which the external port is mapped; and
    securely accessing the particular virtual networking function executing on the device using an external address for the device and the external port at which the particular virtual networking function is accessed externally at the device.

2. The method of claim 1, wherein the deployment file from the central control entity further indicates: (1) a port type of the internal port of the device, and (2) a protocol type for a protocol supported on the internal port of the device.

3. The method of claim 1, wherein the external address for the device included in the deployment file includes an external address of a virtual networking function control process executing on the device.

4. The method of claim 3, wherein mapping comprises generating a port address translation entry stored by the virtual networking function control process, wherein the port address translation entry maps the external port to the internal port so that the particular virtual networking function can be accessed by communication to the external address of the virtual networking function control process on the external port.

5. The method of claim 4, further comprising the virtual networking function control process dynamically allocating a different external address for each of multiple virtual networking functions on the device.

6. The method of claim 5, wherein generating comprises generating a different port address translation entry for each of the multiple virtual networking functions using a different external address and different external port.

7. The method of claim 1, further comprising:
    receiving, from the central control entity, a command at the device to un-deploy the particular virtual networking function on the device; and
    in response to the command to un-deploy the particular virtual networking function, closing the external port and removing the stored portmapping entry for the particular virtual networking function at the device.

8. The method of claim 7, further comprising sending from the device to the central control entity a notification of removal of the particular virtual networking function.

9. An apparatus for securely accessing a virtual networking function at a branch in a network, the apparatus comprising:
    a communication interface configured to enable network communications;
    a memory configured to store executable instructions for one or more virtual networking functions; and
    a processor coupled to the communication interface and the memory, wherein the processor is configured to:
        receive from a central control entity a command to deploy a particular virtual networking function at the apparatus, the command including or accompanied by a deployment file that identifies an external port at which the particular virtual networking function is accessed externally;

map the external port identified by the deployment file from the central control entity to an internal port on an internal management network;

store a portmapping entry for the particular virtual networking function executing on the apparatus based on the mapping between the external port and the internal port;

send to the central control entity a notification containing portmapping information that indicates the internal port to which the external port is mapped; and securely access the particular virtual networking function executing on the apparatus using an external address for the apparatus and the external port at which the particular virtual networking function is accessed externally.

10. The apparatus of claim 9, wherein the external address for the apparatus included in the deployment file includes an external address of a virtual networking function control process executed by the processor.

11. The apparatus of claim 10, wherein the processor is configured to map by:

generating a port address translation entry stored by the virtual networking function control process, wherein the port address translation entry maps the external port to the internal port so that the particular virtual networking function can be accessed by communication to the external address of the virtual networking function control process on the external port.

12. The apparatus of claim 11, wherein the processor is configured to execute the virtual networking function control process to dynamically allocate a different external address for each of multiple virtual networking functions on the device.

13. The apparatus of claim 11, wherein the processor is configured to generate a different port address translation entry for each of the multiple virtual networking functions using a different external address and different external port.

14. The apparatus of claim 9, wherein the processor is further configured to:

receive, from the central control entity, a command to un-deploy the particular virtual networking function at the apparatus; and in response to the command to un-deploy the particular virtual networking function, closing the external port and removing the stored portmapping entry for the particular virtual networking function at the apparatus.

15. One or more non-transitory computer readable storage media encoded with instructions that, when executed by a processor in a device configured to execute one or more virtual networking functions at a branch in a network, cause the processor to perform operations for securely accessing the virtual networking function, the operations comprising:

receiving from a central control entity a command to deploy a particular virtual networking function at the device, the command including or accompanied by a deployment file that identifies an external port at which the particular virtual networking function is accessed externally at the device;

mapping the external port identified by the deployment file from the central control entity to an internal port on an internal management network of the device;

storing at the device a portmapping entry for the particular virtual networking function executing on the device based on the mapping between the external port and the internal port;

sending to the central control entity a notification containing portmapping information that indicates the internal port to which the external port is mapped; and securely accessing the particular virtual networking function executing on the device using an external address for the device and the external port at which the particular virtual networking function is accessed externally at the device.

16. The non-transitory computer readable storage media of claim 15, wherein the external address for the device included in the deployment file includes an external address of a virtual networking function control process executing on the device.

17. The non-transitory computer readable storage media of claim 16, wherein the instructions operable for performing the mapping comprise instructions operable for generating a port address translation entry stored by the virtual networking function control process, wherein the port address translation entry maps the external port to the internal port so that the particular virtual networking function can be accessed by communication to the external address of the virtual networking function control process on the external port.

18. The non-transitory computer readable storage media of claim 17, further comprising instructions operable for causing the virtual networking function control process to dynamically allocate a different external address for each of multiple virtual networking functions on the device.

19. The non-transitory computer readable storage media of claim 18, wherein a different port address translation entry is generated for each of the multiple virtual networking functions using a different external address and different external port.

20. The non-transitory computer readable storage media of claim 15, further comprising instructions operable for:

receiving, from the central control entity, a command at the device to un-deploy the particular virtual networking function on the device; and in response to the command to un-deploy the particular virtual networking function, closing the external port and removing the stored portmapping entry for the particular virtual networking function at the device.

* * * * *